(12) United States Patent
Douglas et al.

(10) Patent No.: US 7,814,479 B2
(45) Date of Patent: Oct. 12, 2010

(54) SIMULTANEOUS DOWNLOAD TO MULTIPLE TARGETS

(75) Inventors: Darren C. Douglas, Tucson, AZ (US); Jason James Graves, Tucson, AZ (US); Lei Liu, Tucson, AZ (US); Sudhir Gurunandan Rao, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 11/304,407

(22) Filed: Dec. 14, 2005

(65) Prior Publication Data
US 2007/0169106 A1    Jul. 19, 2007

(51) Int. Cl.
G06F 9/44    (2006.01)

(52) U.S. Cl. ........................ 717/173; 717/178
(58) Field of Classification Search .......... 717/168–178
See application file for complete search history.

(56) References Cited

U.S. PATENT DOCUMENTS

| | | |
|---|---|---|
| 5,467,286 A | 11/1995 | Pyle et al. |
| 5,793,943 A | 8/1998 | Noll |
| 5,826,075 A | 10/1998 | Bealkowski et al. |
| 5,901,282 A | 5/1999 | Tanuma |
| 5,925,140 A | 7/1999 | Hudson |
| 5,974,312 A | 10/1999 | Hayes, Jr. et al. |
| 6,009,500 A | 12/1999 | Rossi |
| 6,018,806 A | 1/2000 | Cortopassi et al. |
| 6,055,632 A | 4/2000 | Deegan et al. |
| 6,113,652 A | 9/2000 | Lysik et al. |
| 6,185,696 B1 | 2/2001 | Noll |
| 6,199,194 B1 | 3/2001 | Wang et al. |
| 6,240,470 B1 | 5/2001 | Murayama et al. |
| 6,247,168 B1 * | 6/2001 | Green ...................... 717/176 |
| 6,332,198 B1 | 12/2001 | Simons et al. |
| 6,442,067 B1 | 8/2002 | Chawla et al. |
| 6,665,813 B1 | 12/2003 | Forsman et al. |
| 6,675,258 B1 * | 1/2004 | Bramhall et al. ............ 711/114 |
| 6,813,571 B2 | 11/2004 | Lightbody et al. |

(Continued)

FOREIGN PATENT DOCUMENTS

JP    200307591    11/2000

OTHER PUBLICATIONS

B. Holtkamp et al., "A Firmware Monitor to Support Vertical Migration Decisions in the UNIX Operating System", IEEE, 1982, pp. 153-162.

(Continued)

Primary Examiner—Wei Y Zhen
Assistant Examiner—Phillip H Nguyen
(74) Attorney, Agent, or Firm—Janaki K. Davda; Konrad Raynes and Victor LLP

(57) ABSTRACT

Provided are a techniques for processing a download. Under control of a first target device, a download command is received via a first communication medium that indicates that an update is to be downloaded. The download command is issued to a second target device via a second communication medium, wherein the second communication medium is a private device communication medium that enables private communication between the first target device and the second target device. The update is received via the first communication medium. In response to determining that the update has been downloaded, run with the update.

15 Claims, 8 Drawing Sheets

U.S. PATENT DOCUMENTS

| | | | |
|---|---|---|---|
| 6,836,859 B2 * | 12/2004 | Berg et al. | 714/36 |
| 6,907,602 B2 | 6/2005 | Tsai et al. | |
| 6,944,758 B2 | 9/2005 | Lin | |
| 6,957,361 B2 | 10/2005 | Kahler et al. | |
| 6,983,397 B2 | 1/2006 | Fairhurst et al. | |
| 7,036,007 B2 | 4/2006 | Schelling et al. | |
| 7,080,202 B2 * | 7/2006 | Kasako et al. | 711/114 |
| 7,143,275 B2 | 11/2006 | Cepulis et al. | |
| 7,200,727 B2 * | 4/2007 | Kasako et al. | 711/162 |
| 7,203,806 B2 * | 4/2007 | Kasako et al. | 711/162 |
| 7,219,201 B2 * | 5/2007 | Kasako et al. | 711/162 |
| 7,600,055 B2 | 10/2009 | Douglas et al. | |
| 7,673,174 B2 | 3/2010 | Swift et al. | |
| 2002/0046265 A1 | 4/2002 | Suzuki | |
| 2002/0087668 A1 | 7/2002 | San Martin et al. | |
| 2003/0023906 A1 | 1/2003 | Nishimura et al. | |
| 2003/0154471 A1 | 8/2003 | Teachman et al. | |
| 2003/0237018 A1 | 12/2003 | Baba | |
| 2004/0015940 A1 | 1/2004 | Heisey et al. | |
| 2004/0030768 A1 | 2/2004 | Krishnamoorthy et al. | |
| 2004/0076043 A1 | 4/2004 | Boals et al. | |
| 2004/0103340 A1 | 5/2004 | Sundareson et al. | |
| 2004/0103347 A1 | 5/2004 | Sneed et al. | |
| 2004/0120001 A1 | 6/2004 | Boldon | |
| 2004/0153738 A1 | 8/2004 | Otaka et al. | |
| 2004/0197073 A1 | 10/2004 | Oesterreicher et al. | |
| 2004/0228063 A1 | 11/2004 | Hawkins et al. | |
| 2005/0044314 A1 | 2/2005 | Goodman et al. | |
| 2005/0081090 A1 | 4/2005 | Lin | |
| 2005/0102562 A1 | 5/2005 | Shinohara et al. | |
| 2005/0108288 A1 | 5/2005 | Hartshorne et al. | |
| 2005/0138468 A1 | 6/2005 | Asare et al. | |
| 2005/0138645 A1 | 6/2005 | Lu | |
| 2005/0188170 A1 | 8/2005 | Yamamoto | |
| 2005/0223372 A1 | 10/2005 | Borchers | |
| 2006/0005016 A1 | 1/2006 | Lee et al. | |
| 2006/0069825 A1 | 3/2006 | Hodder | |
| 2006/0085564 A1 | 4/2006 | Bomhoff et al. | |
| 2006/0095644 A1 | 5/2006 | Fujita et al. | |
| 2006/0200707 A1 | 9/2006 | Shishido et al. | |
| 2006/0280150 A1 | 12/2006 | Jha et al. | |
| 2006/0282653 A1 | 12/2006 | Chu et al. | |
| 2007/0055969 A1 | 3/2007 | Yang | |
| 2007/0260775 A1 | 11/2007 | Bita et al. | |
| 2008/0027602 A1 | 1/2008 | Yeap et al. | |
| 2008/0109647 A1 | 5/2008 | Gavens et al. | |
| 2008/0109798 A1 | 5/2008 | Gavens et al. | |
| 2008/0189693 A1 | 8/2008 | Pathak | |
| 2008/0235501 A1 | 9/2008 | Bailey et al. | |
| 2008/0276122 A1 | 11/2008 | Vangeel | |

OTHER PUBLICATIONS

D. E. Lowell, et al., "Devirtualizable Virtual Machines Enabling General, Single-Node, Online Maintenance", ACM, 2004, pp. 211-223.

Qian, "Updating BIOS and Firmware on a Group of Servers", May 2002 [online] [retrieved Sep. 7, 2004] from http://www1.us.dell.com/content/topics/global.aspx/power/en/ps2q02_qian?c=us&cs=RC968571&l=en&s=hea>.

* cited by examiner

SIMULTANEOUS DOWNLOAD TO MULTIPLE TARGETS

BACKGROUND

1. Field

Embodiments of the invention relate to simultaneous download (e.g., of firmware or software) from a source to multiple targets.

2. Description of the Related Art

An enterprise may be described as a large entity (e.g., a corporation, government entity, etc.) that uses computers. An enterprise class storage system may be described as a storage system that is designed for high performance and high availability and that is primarily used by larger corporations to store data. Non-disruptive maintenance for enterprise class storage systems enables achievement of availability higher than 99.99%. In particular, it is desirable for enterprise class storage systems to provide availability at least at 99.995%. Non-disruptive maintenance for many enterprise class storage systems also includes firmware upgrades for devices on the enterprise class storage systems. Non-disruptive operation requires redundant devices to survive failures and non-disruptive maintenance requires increasing the reliability of the upgrade and minimizing the time to upgrade firmware on redundant devices.

To support redundancy, some devices mirror other devices in the enterprise class storage system, and these mirrored devices may share responsibility and control over certain resources. Each of the mirrored devices should have a same level of firmware. In conventional enterprise class storage systems, there are separate device communication mediums (or "paths") to each device such that each device can receive a separate update of the same firmware.

FIG. 1 illustrates a prior art system for downloading firmware to multiple target devices. In FIG. 1, an initiating device 100 downloads firmware over device communication mediums 140, 150, 160 to Target Device A 110, Target Device B 120, and Target Device C 130, respectively. To download firmware, the initiating device 100 downloads the firmware over a device communication medium connecting the initiating device 100 to a target device that is to be updated with firmware. Then, the target device firmware is updated with the firmware. When there are multiple target devices 110, 120, 130, firmware is downloaded to one target device at a time on the device communication medium 140, 150, 160 being used. Even if the initiating device 100 is downloading firmware to multiple target devices, a separate device communication medium 140, 150, 160 is used for each target device. In some cases of downloading firmware to target devices, another device (other than the initiating device 100) may initiate and control the update.

Thus, the traditional technique is to perform firmware upgrades serially (i.e., by downloading the firmware to one device at a time). This approach has the potential to reduce overall reliability and availability of the enterprise class storage system owing to potential for errors leading to mismatching firmware on redundant devices and total upgrade time being proportional to the number of redundant devices, with any enterprise class storage system fault in this time having the potential for increasing enterprise class storage system downtime (e.g., in an enterprise class storage system with a redundant pair of devices, firmware upgrade takes two times (2×) the time to upgrade one device).

Thus, there is a need in the art for improved simultaneous download of firmware to multiple target devices.

SUMMARY OF EMBODIMENTS OF THE INVENTION

Provided are a method, computer program product, and system for processing a download. Under control of a first target device, a download command is received via a first communication medium that indicates that an update is to be downloaded. The download command is issued to a second target device via a second communication medium, wherein the second communication medium is a private device communication medium that enables private communication between the first target device and the second target device. The update is received via the first communication medium. In response to determining that the update has been downloaded, run with the update.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments perform a simultaneous download to multiple targets that share a common device communication medium (i.e., a transmission medium). When the devices share the same device communication medium, embodiments provide a way to simultaneously update both devices (also referred to as "target" devices) from the device initiating the update (also referred to as an "initiating" device). Embodiments improve efficiency for the initiating device initiating the firmware update by performing a redundant update that does not require any changes on the initiating device.

Figure 2:
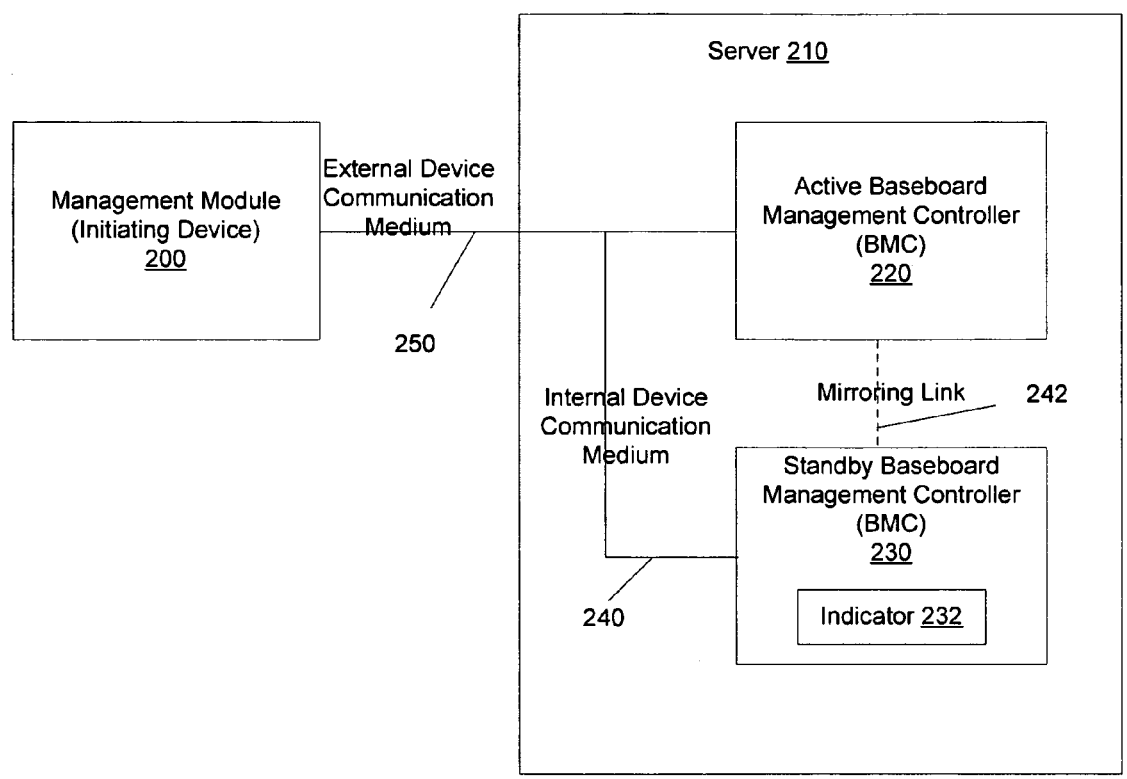
FIG. 2 illustrates details of a computing system in accordance with certain embodiments.

FIG. 2 illustrates details of a computing system in accordance with certain embodiments of the present invention. In FIG. 2, a Management Module (MM) 200 is an initiating device and is connected via an external device communication medium 250 to a server 210. The server 210 includes active Baseboard Management Controller (BMC) 220 and standby Baseboard Management Controller (BMC) 230. The active and standby BMCs 220, 230 provide management capabilities to local resources and redundant management capabilities to shared resources. The standby BMC 230 includes an indicator 232 that is set to maintain synchronization between the active BMC 220 and the standby BMC 230 during downloads. The active BMC 220 and standby BMC 230 may be referred to as first and second target devices, respectively. The active BMC 220 and the standby BMC 230 may communicate over a mirroring link 242. The mirroring link 242 may be described as a private device communication medium that enables private communication between the active and standby BMCs 220, 230. The management module 200 is not able to send communications directly on the mirroring link 242. The management module 200 downloads firmware to both the active and standby BMCs 220, 230 by issuing the firmware over a single external device communication medium 250 to both the active and standby BMCs 220, 230. The internal device communication medium 240 is coupled to the external device communication medium 250. In certain embodiments, the external device communication medium 250 may be a bus (e.g., a RS485 serial bus inter-integrated circuit (I2C) bus, a Dual Port RAM (DPRAM), or other bus-based media), and the internal device communication medium 240 may be a bus (e.g., an internal RS485 serial bus, inter-integrated circuit (I2C) bus, a Dual Port RAM (DPRAM), or other bus-based media) connected to the external device communication medium 250.

In certain embodiments, the firmware download solution is used for a blade server in an IBM® BladeCenter® chassis (available from International Business Machines Corporation), where the blade server has dual baseboard management controllers (BMCs). The blade server may be described as an enterprise class storage system. However, embodiments are applicable to any set of target devices (e.g., redundant devices, such as the active and standby BMCs 220, 230), may use any shared communication medium (e.g., internal device communication medium 240) between the target devices that permits "snooping" in promiscuous mode, and may use any private device communication medium (e.g., mirroring link 242) between the redundant target devices. Promiscuous mode may be described as a mode in which the target devices intercept and read each communication (e.g., network packet) that arrives in its entirety. Embodiments may be used in networks that are serial or non-serial. Although examples herein may refer to firmware download, embodiments are applicable to software downloads. Also, there may be any number of devices that receive the download over a same device communication medium.

In FIG. 2, the management module 200 is only aware of the active BMC 220. Thus, the active BMC 220 is the target device that receives the download from the management module, which is the initiator of the firmware download. Both the active BMC 220 and the standby BMC 230 use the same communication medium to communicate with the management module 200. As mentioned above, the active and standby BMCs 220, 230 provide management capabilities to local resources and redundant management capabilities to shared resources. The active and standby BMCs 220, 230 maintain consistency with each other through the mirroring link 220 (e.g., an inter-integrated circuit (I2C) bus). Thus, in case of failure of the active BMC 220, the standby BMC 230 may take over communication with the management module 200. Therefore, when a firmware download occurs through the management module 200, both the active and standby BMCs 220, 230 are updated so that they maintain firmware consistency.

During normal operation (e.g., when a firmware download is not occurring), one BMC (e.g., the active BMC 220) is said to "own" the external device communication medium 250, and so one BMC is capable of communicating with the management module 200 at a time. Although the management module 200 is aware of sending commands to the active BMC 220, the management module 200 does not speak directly to the active BMC 220. Instead, the management module 200 sends messages to an address on the external device communication medium 250 that is associated with the server 210 slot, and the active and standby BMCs 220, 230 are capable of responding to and/or listening on this address. Therefore, from the management module 200 perspective, the management module is speaking to one BMC at any moment in time. In certain embodiments of the dual BMCs 220, 230 in a server 210, there is no hardware inhibitor that prevents both BMCs from actively using the external device communication medium 250 (where the standby BMC 230 may access the external device communication medium 250 via the internal device communication medium 240). In certain embodiments, however, the external device communication medium 250 is actively used by a default BMC that is defined as the active BMC 220, and the other BMC 230 remains in an inactive state with the internal device communication medium 240 until the active BMC 220 that is actively using the external device communication medium 250 fails.

Figure 1:
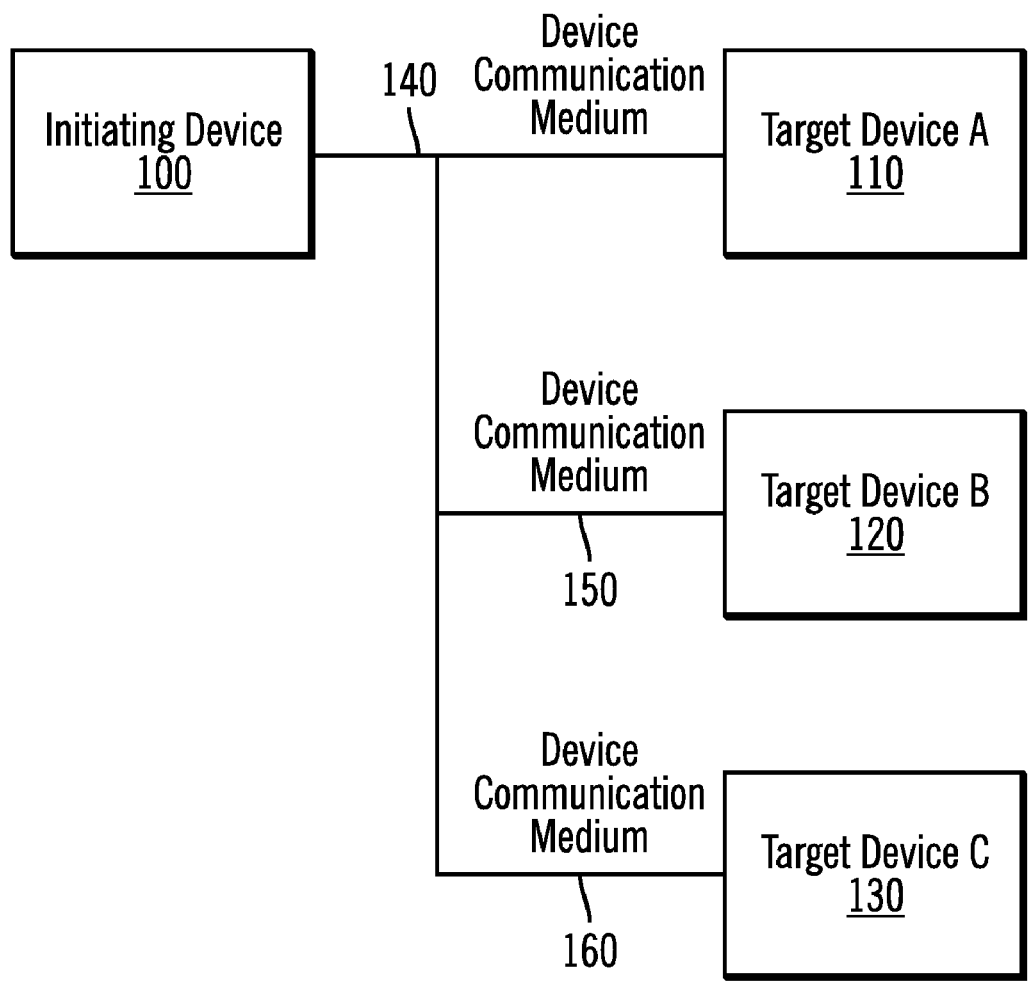
FIG. 1 illustrates a prior art system for downloading firmware to multiple target devices

Thus, to address the issue of simultaneous firmware downloads, embodiments enable the active and standby BMCs 220, 230 to communicate on the mirroring link 242 and enable the standby BMC 230 to use the internal device communication medium 240 while firmware is being downloaded to the active BMC 220. In particular, the active BMC 220 communicates with the standby BMC 230 over the mirroring link 242 to indicate to the standby BMC 230 that firmware is about to be downloaded. In response, the standby BMC acknowledges receipt of this indication to the active BMC 220 and starts to listen to communications on the internal device communication medium 240. Prior to receipt of an indication from the active BMC 220 that firmware is about to be downloaded, the standby BMC 230 does not listen to communications on the internal device communication medium 240. Also, unlike conventional systems, embodiments avoid the use of separate, external device communication mediums for each target device (see prior art FIG. 1).

Since the active and standby BMCs 220, 230 are designed for redundancy, it is important that when firmware on the active BMC 220 is updated, the firmware on the standby BMC 230 is also updated with the same firmware.

Figure 3A:
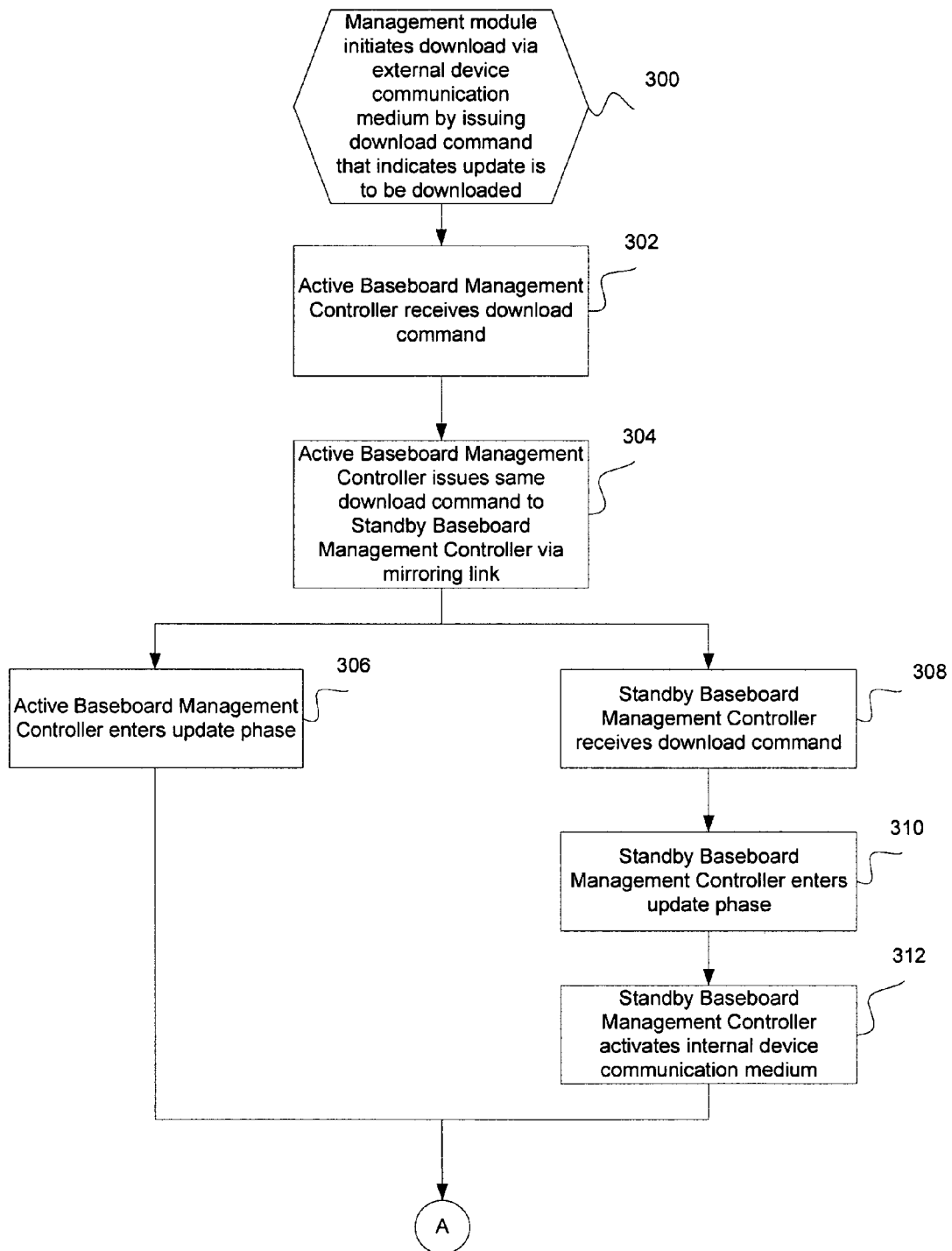
FIGS. 3A and 3B illustrate logic for a simultaneous firmware download in accordance with certain embodiment.
Figure 3B:
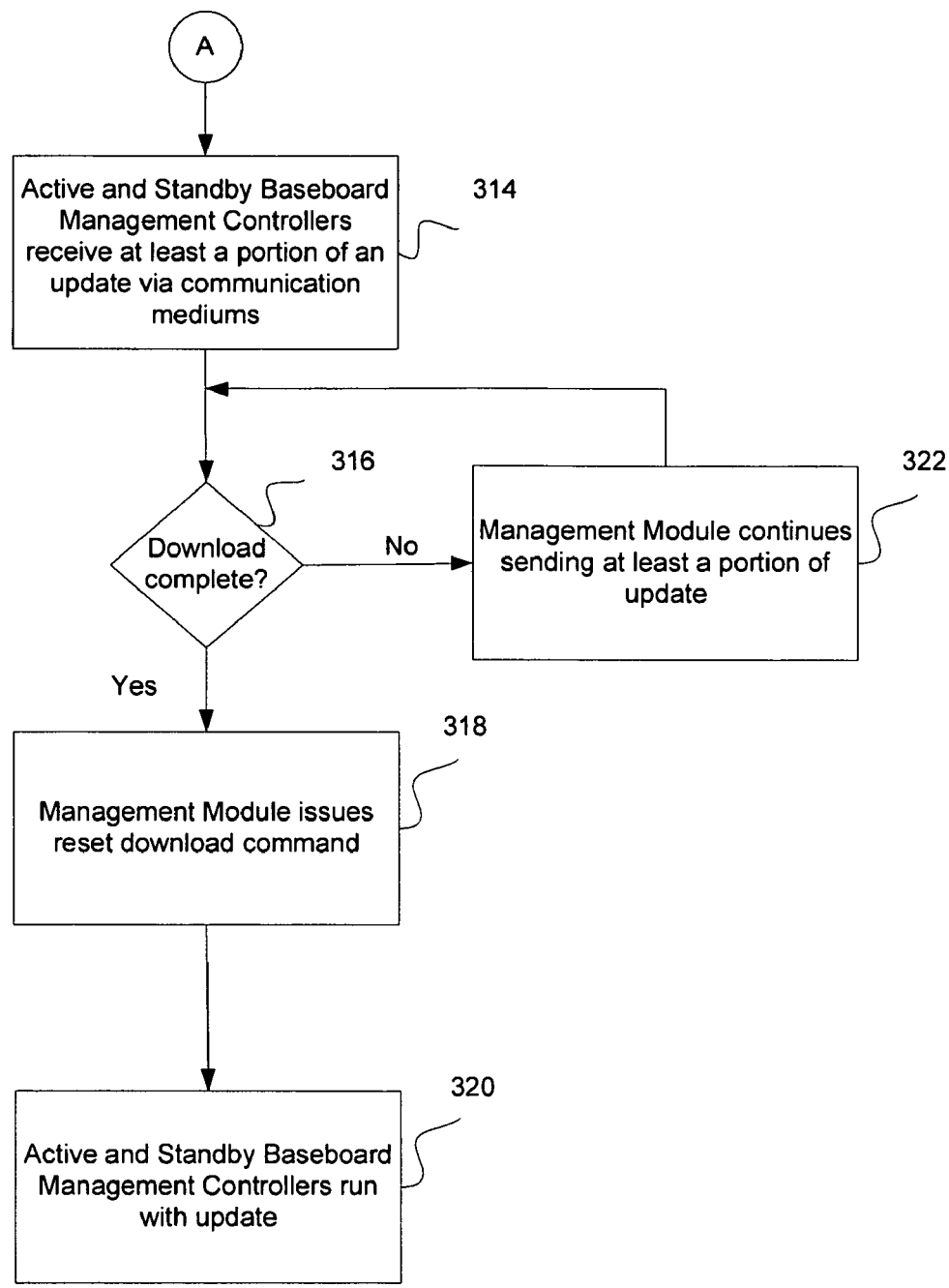

FIGS. 3A and 3B illustrate logic for a simultaneous download in accordance with certain embodiment. Control begins at block 300 of FIG. 3A with the management module 200 initiating download via the external device communication medium 250 by issuing a download command that indicates that an update is to be downloaded. The download command may be, for example, one that indicates that the active BMC 220 is to move into a state to receive an update (i.e., an "update state"). In certain embodiments, the update may occur at a BMC when that BMC is in a boot mode. Boot mode may be described as a mode in which an operating system runs in a restricted manner, such that the operating system processes a subset of commands (rather than all commands the operating system would otherwise process), and where the subset of commands pertains to updating firmware and to verifying that an instruction set in memory has not been corrupted. In block 302, the active BMC 220 receives the download command. In block 304, the active BMC issues the same download command to the standby BMC 230 via the mirroring link 242. Thus, when the management module 200 establishes an update session with the active BMC 220, the active BMC 220 contacts the standby BMC 230 and establishes a standby BMC 230 update proxy session.

The processing of block 306 and blocks 308-312 may occur in parallel or serial form. In block 306, the active BMC 220 enters an update phase. In block 308, the standby BMC 230 receives the download command. In block 310, the standby BMC 230 enters an update phase. In block 312, the standby BMC 230 activates the internal device communication medium 240. Activating the internal communication medium 240 results in the standby BMC 230 listening on the internal device communication medium 240. Prior to receipt of the download command, the standby BMC 230 was not listening on the internal device communication medium 240. In particular, the standby BMC 230 may be said to be a passive listener that is snooping on packets on the external device communication medium 250 via the internal communication medium 240.

From blocks 306, 312 processing continues to block 314 in FIG. 3B. In block 314, the active and standby BMCs 220, 230 receive at least a portion of an update via the device communication mediums 240, 250. Examples of the update include a portion of firmware or software that is being downloaded. In particular, the active BMC 220 listens on the external device communication medium 250, while the standby BMC 230 listens on the internal device communication medium 240.

In block 316, the management module 200 determines whether the download is complete (i.e., whether the update has downloaded completely). In certain embodiments, the management module 200 maintains an indication of how many blocks make up a download and makes the determination of whether the download is complete based on the number of blocks that have been sent. If so, processing continues to block 318, otherwise, processing continues to block 322. In block 322, the management module 200 continues sending at least a portion of the update to the active and standby BMCs 220, 230. In this manner, the active and standby BMCs 220, 230 may receive the update as a series of downloads or as a single download (e.g., depending on the size of the download).

Thus, when the active BMC 220 that is actively using the external device communication medium 250 receives the download command from the management module 200, the active BMC 220 sends a corresponding download command over the mirroring link 242 to the standby BMC 230. When this download command is received, the standby BMC 230 then activates the internal device communication medium. Therefore, for the update state, both the active and standby BMCs 220, 230 actively use the communication mediums 240, 250 until the download is complete. From the management module 200 perspective, the management module 200 is executing the download as if downloading to one BMC. Therefore, with embodiments, no changes are needed to the management module 200 to operate with more than one BMC in a server 210 using this simultaneous download solution.

Continuing with FIG. 3B, in block 318, the management module 200 issues a reset download command, which indicates to the active and standby BMCs 220, 230 that they are to come out of the update state (e.g., boot mode) and start running with the updated firmware. In block 320, the active and standby BMCs 220, 230 run with the updated firmware. That is, when the management module 200 issues the reset download command, both the active and standby BMCs 220, 230 receive the reset download command and reset. On reset, the active and standby BMCs 220, 230 return to their default operating state and the BMC that is predefined as the active BMC 220 on the device communication medium 250 reclaims that activity, while the standby BMC 230 returns to an inactive state with the internal device communication medium 240.

Thus, for each packet that the management module 200 sends on the external device communication medium 250, both the active and standby BMCs 220, 230 update the appropriate data (e.g., firmware or software), and the active BMC 220 waits for an affirmative acknowledgment from the standby BMC 230 on the mirroring link 242. The active BMC 220 acknowledges the affirmative acknowledgment of the standby BMC 230. The standby BMC 230 uses this affirm-acknowledge protocol to maintain an indicator (e.g., a bit) in set/reset states to keep the active and standby BMCs 220, 230 synched in a lock-step manner. Note that the active BMC 220 may be interrupted as a result of which timing delays may break the synchronization without use of the indicator. The active BMC 220 responds to the management module 200 for every packet upon receiving the affirmative acknowledgment from the standby BMC 230 or upon time out. Upon time out, the management module 200 may resend the packet. In certain embodiments thresholds may be added in the management module 200 to recover from active BMC 220 or standby BMC 230 faults, where the thresholds relate to timeouts by the active BMC 220 or standby BMC 230.

Figure 4A:
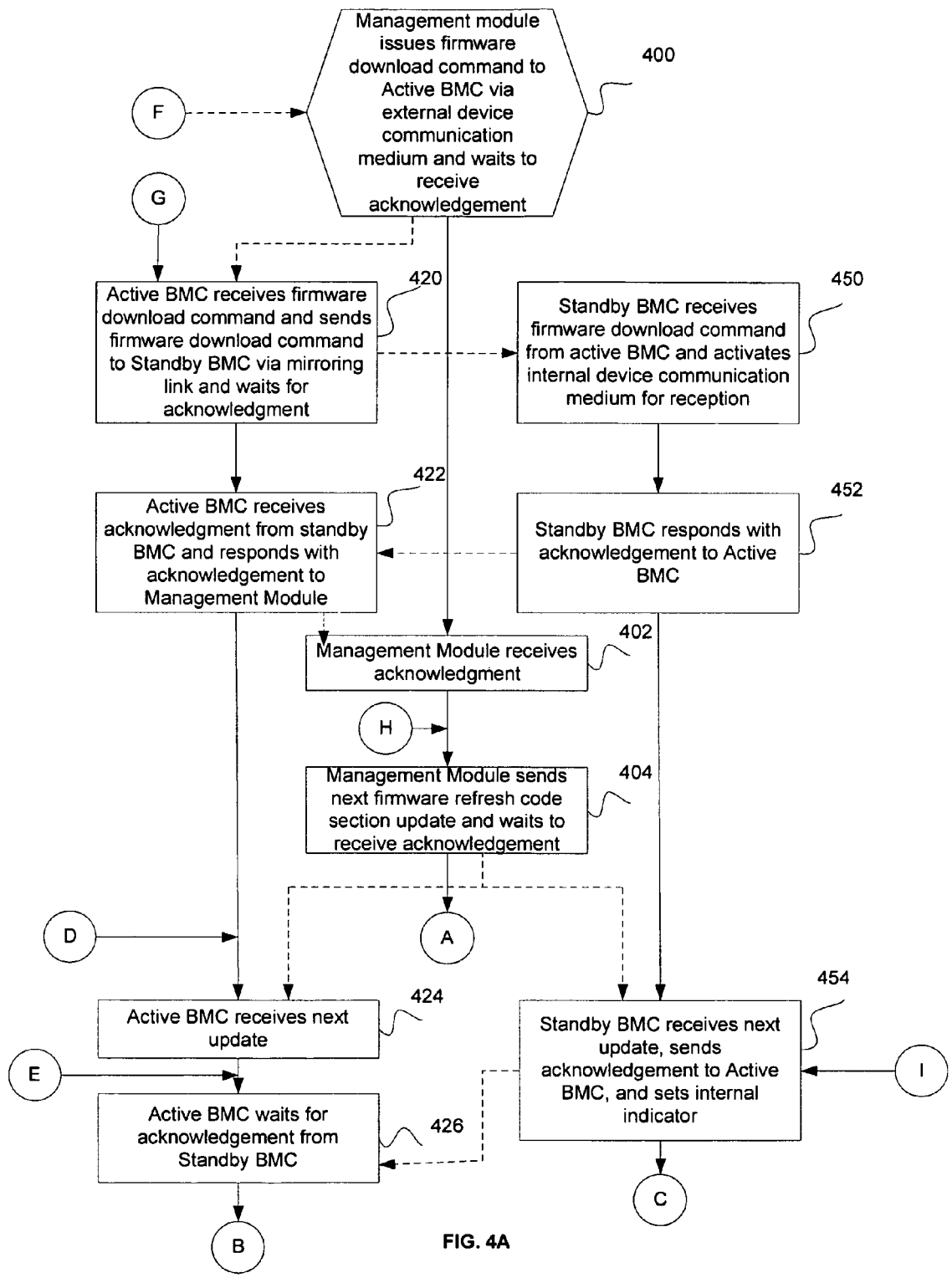
FIGS. 4A and 4B illustrates firmware download protocol control flow and data flow between a management module and an active BMC and between an active BMC and a standby BMC in accordance with certain embodiments.
Figure 4B:
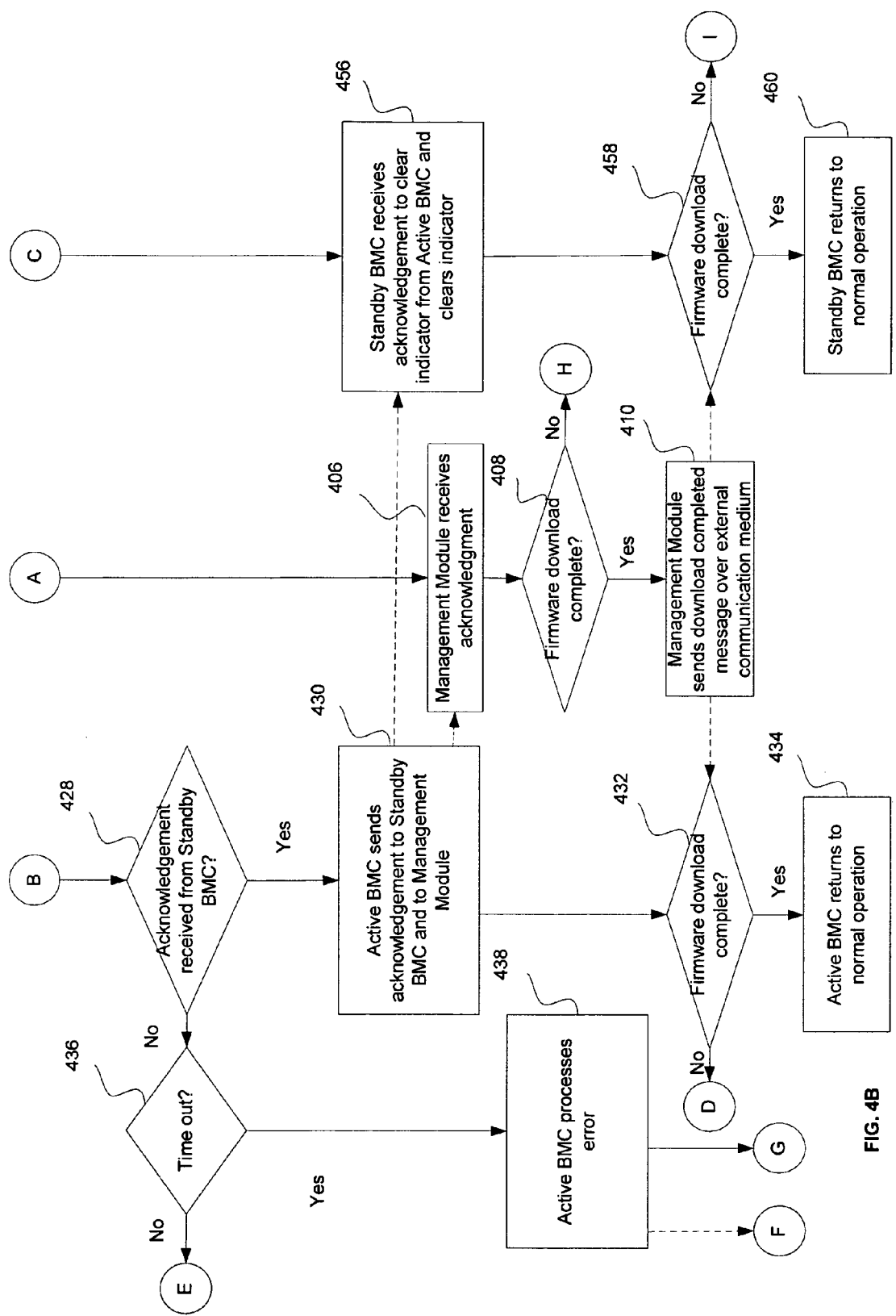

FIGS. 4A and 4B illustrate a firmware download protocol control flow and data flow between a management module 200 and an active BMC 220 and between the active BMC 220 and a standby BMC 230 in accordance with certain embodiments. In FIGS. 4A and 4B, the solid lines illustrate control flow, while the dashed lines illustrate data flow (i.e., message flow).

In certain embodiments, at the beginning of the firmware download session, the active BMC 220 syncs up with the standby BMC 230 with a command-send and acknowledgment (e.g., an "OK" response). In certain embodiments, communication between the BMCs is on the mirroring link 242 (see FIG. 2). After the active BMC 220 sends the same download command to the standby BMC 230 that the active BMC 220 receives from the management module 200, the standby BMC 230 listens on the internal device communication medium 240 and updates the firmware at the same time as the active BMC 230, which is listening on the external device communication medium 250. At the end of such a firmware update, the standby BMC 230 sends an acknowledgment (e.g., another "OK" response) to the active BMC 220. The active BMC 220 responds back with an acknowledgment that the standby BMC 230 uses to clear an internal indicator (e.g., a bit). This indicator and the acknowledgment/response protocol for each firmware update is used to keep the active and standby BMC pair 220, 230 in lock-step so that one BMC does not go ahead of the other.

In certain embodiments, the management module 200 may reinitiate the firmware download in the event of errors or timeouts. In the event of errors or timeouts, the active BMC 220 and standby BMC 230 would remain in the update state (e.g., boot mode).

Control begins at block 400 of FIG. 4A with the management module 200 issuing a firmware download command to the active BMC 220 via the external device communication medium 250 and waits to receive an acknowledgment. In block 402, the management module 200 receives the acknowledgment from the active BMC 220. In block 404, the management module 200 sends a next firmware refresh code section update and waits to receive an acknowledgment. From block 404 (FIG. 4A), processing continues to block 406 (FIG. 4B). In block 406, the management module 200 receives the acknowledgment from the active BMC 420. In block 408, the management module 200 determines whether the firmware download is complete. If so, processing continues to block 410, otherwise, processing loops back to block 404 (FIG. 4A). In block 410, the management module 200 sends a download complete message over the external device communication medium 250. Thus, the active and standby BMCs 220, 230 receive the firmware update as a series of downloads.

In FIG. 4A, in block 420, the active BMC 220 receives the firmware download command from the management module 200 and sends the firmware download command to the standby BMC via the mirroring link 242 and waits for an acknowledgment. In block 422, the active BMC 220 receives an acknowledgment from the standby BMC 230 that the firmware download command was received at the standby BMC 230 and responds with an acknowledgment to the management module 200 that indicates that the firmware download command was received at the active BMC 220. In block 424, the active BMC 220 receives the next firmware refresh code section update. In block 426, the active BMC 220 waits for an acknowledgment from the standby BMC 230. At this point in processing, the standby BMC 230 is directly receiving the firmware refresh code section update via the internal device communication medium 240, and, once the update is received, the standby BMC 230 sends an acknowledgment that indicates receipt of the firmware refresh code section update to the active BMC 220. From block 426 (FIG. 4A), processing continues to block 428 (FIG. 4B).

In block 428, the active BMC 220 determines whether an acknowledgment has been received from the standby BMC 230. If so, processing continues to block 430, otherwise, processing continues to block 436. In block 430, the active BMC 220 sends an acknowledgment to the standby BMC 230 and to the management module 200. The acknowledgment to the standby BMC 230 indicates that an indicator may be cleared (i.e., reset). The acknowledgment to the management module 200 indicates that the last received firmware refresh code section update has been processed.

In block 432, the active BMC 220 determines whether the firmware download is complete. If so, processing continues to block 434, otherwise, processing loops back to block 424 (FIG. 4A) to receive the next update. In block 434, the active BMC 220 returns to normal operation.

From block 428, if an acknowledgment has not been received from the standby BMC 230, processing continues to block 436, and the active BMC 220 determines whether processing by the standby BMC 230 has timed out (i.e., has taken more than a predetermined amount of time). If so, processing continues to block 438, otherwise, processing loops back to block 426 (FIG. 4A) and waits for the acknowledgment. In block 438, the active BMC 220 processes the error. In certain embodiments, the active BMC 220 sends an error message to the management module 200 and waits to hear from the management module 200. In certain embodiments, the active BMC 220 lets the management module 200 timeout and waits to hear from the management module 200. The management module 200 may resend the firmware download command in the event that the firmware download takes longer than an amount of time allotted by the management module 200. Also, the management module 200 may timeout if the firmware download takes too long. In this event, the firmware download may be reported as failed to the end user, and the user may reinitiate the firmware download. However, if the active BMC 220 reports an error, the active BMC is reporting that firmware download failed, which is why the firmware download may begin again. In certain alternative embodiments, the active BMC 220 may return an error on the last packet received, and the management module 200 (or an initiating device) may resend just the last packet. From block 438, processing continues to block 420, and the active BMC 220 waits to receive the firmware download command from the management module 200.

In FIG. 4A, in block 450, the standby BMC 230 receives the firmware download command from the active BMC 230 and activates the internal device communication medium for reception. In block 452, the standby BMC 230 responds with an acknowledgment that the firmware download command has been received to the active BMC 220. In block 454, the standby BMC 230 receives the next firmware refresh code section update via the internal device communication medium 240, sends an acknowledgment of receipt to the active BMC 220, and sets an internal indicator. From block 454, processing continues to block 456 (FIG. 4B).

In block 456, the standby BMC 230 receives an acknowledgment to clear the indicator from the active BMC 230 and clears the indicator. In block 458, the standby BMC 230 determines whether the firmware download is complete. If so, processing continues to block 460, otherwise, processing loops back to block 454 (FIG. 4A) to receive the next update. In block 460, the standby BMC 230 returns to normal operation.

For ease of illustration, one standby BMC has been shown. However, there may be more than one standby BMC or target device. The firmware download protocol described herein may be performed via arbitration over the shared equivalent of the mirroring link. In particular, because multiple standby BMCs may passively listen for the download, in the event that there is more than one standby BMC listening in to the firmware download, certain embodiments may require arbitration with regard to the responses the standby BMCs provide back to the active BMC. The active BMC may only obtain one response at a time from the standby BMCs, so, if one of the standby BMCs fails to get the update correctly, that standby BMC sends a message to the active BMC. Thus, the arbitration is in relation to the responses provided by the standby BMCs.

The simultaneous (e.g., "one-shot") firmware download minimizes the time for a non-disruptive firmware upgrade (i.e., to 1× the time to download firmware to one device) and increases the overall availability and reliability by avoiding firmware disparity across target devices, which could happen otherwise as a result of errors, and also by reducing the time for discovery of a faulty firmware upgrade.

Thus, embodiments exploit the existence of an additional device communication medium (i.e., the mirroring link) between redundant devices that may normally exist for detection for failure of the active device. This additional device communication medium is distinct from the device communication medium that is used for firmware upgrades and may be used to correctly and reliably accomplish a simultaneous firmware upgrade.

IBM and BladeCenter are registered trademarks or common law marks of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3A, 3B, 4A, and 4B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3A, 3B, 4A, and 4B may be implemented in software, hardware, programmable and non-programmable gate array logic or in some combination of hardware, software, or gate array logic.

Figure 5:
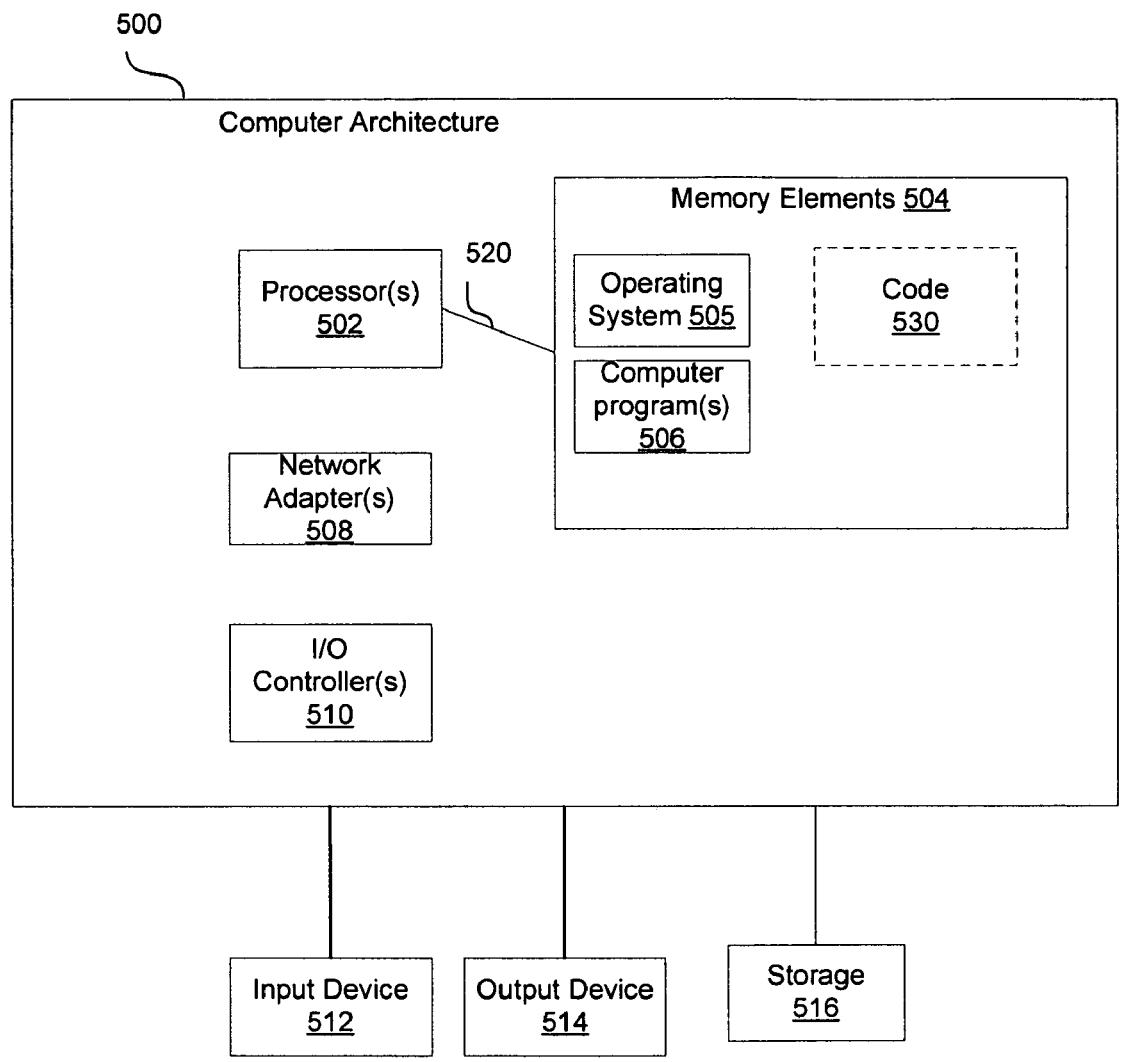
FIG. 5 illustrates a system architecture that may be implemented by a server in accordance with certain embodiments.

FIG. 5 illustrates a system architecture 500 that may be implemented by the server 210 in accordance with certain embodiments. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506. The memory elements 504 may also include code 530 that implements some or all of the described operations taught by embodiments of the invention. Although code 530 is shown, the described operations taught by embodiments of the invention may alternatively be implemented in hardware or in a combination of hardware and software.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

Figure 6:
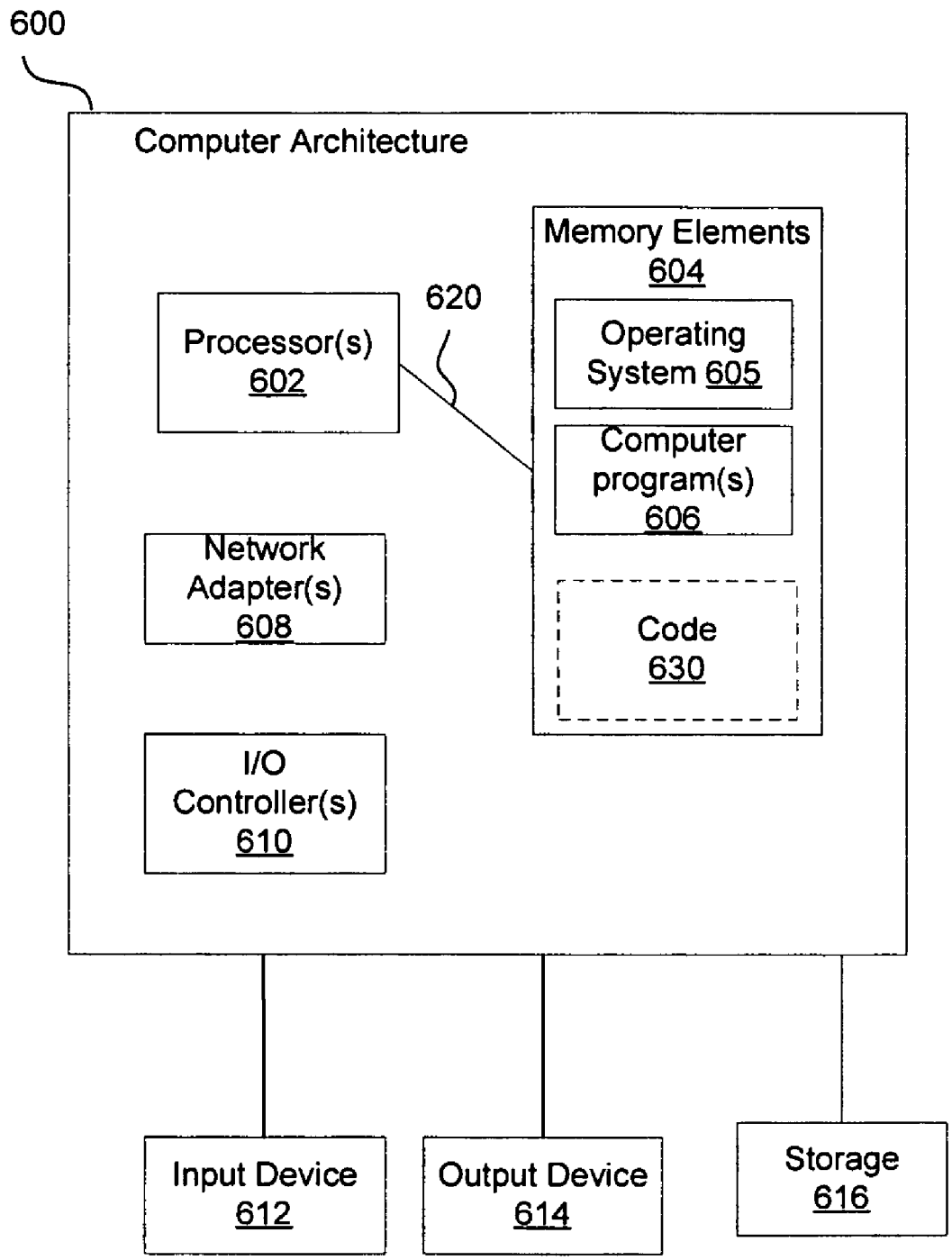
FIG. 6 illustrates a system architecture that may be implemented with functionality of a management module in accordance with certain embodiments.

FIG. 6 illustrates a system architecture 600 that may be implemented with functionality of a management module 200 in accordance with certain embodiments. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606. The memory elements 604 may also include code 630 that implements some or all of the described operations taught by embodiments of the invention. Although code 630 is shown, the described operations taught by embodiments of the invention may alternatively be implemented in hardware or in a combination of hardware and software.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer program product comprising a computer readable medium including a computer readable program, wherein the computer readable program when executed by a processor on a computer causes the computer to:
    under control of a first target device,
        receive a download command via a first communication medium that indicates that an update is to be downloaded, wherein the first target device is connected to a management module with the first communication medium;
        issue the download command to a second target device via a second communication medium, wherein the second communication medium is a private device communication medium that enables private communication between the first target device and the second target device;
        in response receiving an acknowledgment from the second target device indicating that the download command has been received, receive the update via the first communication medium from the management module at a same time as the second target device receives the update from the management module; and
        in response to determining that the update has been downloaded, run with the update; and
    under control of the second target device,
        receive the download command from the first target device via the second communication medium;
        in response to receiving the download command, activate an internal device communication medium to enable the second target device to listen on the internal device communication medium as a passive listener that is snooping on packets sent by the management module on the first communication medium via the internal communication medium, wherein the internal device communication medium is coupled to the first communication medium; and
        receive the update via the internal device communication medium from the management module, wherein the second target device and the first target device receive the update simultaneously from the management module.

2. The computer program product of claim 1, wherein the computer readable program when executed on a computer causes the computer to:
    under control of the first target device,
        wait to receive the acknowledgment from the second target device indicating that the download command has been received.

3. The computer program product of claim 1, wherein the update is received as a series of downloads and wherein the computer readable program when executed on a computer causes the computer to:
    under control of the first target device,
        wait to receive an acknowledgment from the second target device for each one of the series of downloads; and
        in response to determining that the acknowledgment has not been received from the second target device within a predetermined amount of time, process an error.

4. The computer program product of claim 1, wherein the update is received as a series of downloads and wherein the computer readable program when executed on a computer causes the computer to:
    under control of the second target device,
        send an acknowledgment to the first target device upon receipt of each one of the series of downloads.

5. The computer program product of claim 1, wherein the second target device maintains an indicator to maintain synchronization between the first target device and the second target device while receiving the update.

6. A computer-implemented method for processing a download, comprising:
    under control of a first target device,
        receiving a download command via a first communication medium that indicates that an update is to be downloaded, wherein the first target device is connected to a management module with the first communication medium;
        issuing the download command to a second target device via a second communication medium, wherein the second communication medium is a private device communication medium that enables private communication between the first target device and the second target device;
        in response receiving an acknowledgment from the second target device indicating that the download command has been received, receiving the update via the first communication medium from the management module at a same time as the second target device receives the update from the management module; and in response to determining that the update has been downloaded, running with the update; and under control of the second target device, receiving the download command from the first target device via the second communication medium;

in response to receiving the download command, activating an internal device communication medium to enable the second target device to listen on the internal device communication medium as a passive listener that is snooping on packets sent by the management module on the first communication medium via the internal communication medium, wherein the internal device communication medium is coupled to the first communication medium; and receiving the update via the internal device communication medium from the management module, wherein the second target device and the first target device receive the update simultaneously from the management module.

7. The method of claim 5, further comprising:
under control of the first target device,
waiting to receive the acknowledgment from the second target device indicating that the download command has been received.

8. The method of claim 5, wherein the update is received as a series of downloads and further comprising:
under control of the first target device,
waiting to receive an acknowledgment from the second target device for each one of the series of downloads; and
in response to determining that the acknowledgment has not been received from the second target device within a predetermined amount of time, processing an error.

9. The method of claim 6, wherein the update is received as a series of downloads and further comprising:
under control of the second target device,
sending an acknowledgment to the first target device upon receipt of each one of the series of downloads.

10. The method of claim 6, wherein the second target device maintains an indicator to maintain synchronization between the first target device and the second target device while receiving the update.

11. A system for processing a download, comprising:
hardware logic capable of performing operations, the operations comprising:
under control of a first target device,
receiving a download command via a first communication medium that indicates that an update is to be downloaded, wherein the first target device is connected to a management module with the first communication medium;
issuing the download command to a second target device via a second communication medium, wherein the second communication medium is a private device communication medium that enables private communication between the first target device and the second target device;

in response receiving an acknowledgment from the second target device indicating that the download command has been received, receiving the update via the first communication medium from the management module at a same time as the second target device receives the update from the management module; and in response to determining that the update has been downloaded, running with the update; and under control of the second target device, receiving the download command from the first target device via the second communication medium;

in response to receiving the download command, activating an internal device communication medium to enable the second target device to listen on the internal device communication medium as a passive listener that is snooping on packets sent by the management module on the first communication medium via the internal communication medium, wherein the internal device communication medium is coupled to the first communication medium; and receiving the update via the internal device communication medium from the management module, wherein the second target device and the first target device receive the update simultaneously from the management module.

12. The system of claim 11, wherein the operations further comprise:
under control of the first target device,
waiting to receive the acknowledgment from the second target device indicating that the download command has been received.

13. The system of claim 11, wherein the update is received as a series of downloads and wherein the operations further comprise:
under control of the first target device,
waiting to receive an acknowledgment from the second target device for each one of the series of downloads; and
in response to determining that the acknowledgment has not been received from the second target device within a predetermined amount of time, processing an error.

14. The system of claim 11, wherein the update is received as a series of downloads and wherein the operations further comprise:
under control of the second target device,
sending an acknowledgment to the first target device upon receipt of each one of the series of downloads.

15. The system of claim 11, wherein the second target device maintains an indicator to maintain synchronization between the first target device and the second target device while receiving the update.

* * * * *